United States Patent [19]

Froment

[11] Patent Number: 4,883,152

[45] Date of Patent: Nov. 28, 1989

[54] STARTER DRIVE ASSEMBLIES FOR INTERNAL COMBUSTION ENGINES OF THE TYPE HAVING AN OVERRUNNING CLUTCH

[75] Inventor: Francis Froment, Lyons, France

[73] Assignee: Societe Equipements Electriques Moteur, Creteil, France

[21] Appl. No.: 193,682

[22] Filed: May 13, 1988

[30] Foreign Application Priority Data

May 21, 1987 [FR] France .................. 8707355

[51] Int. Cl.⁴ .................. F16D 7/06; F16D 15/00
[52] U.S. Cl. .................. 192/42; 192/41 R; 192/48.3; 192/48.6; 192/48.92; 192/56 R; 192/84 B; 74/7 C
[58] Field of Search .................. 192/41 R, 42, 48.3, 192/48.6, 48.92, 56 R, 89 B; 74/7 C

[56] References Cited

U.S. PATENT DOCUMENTS

| | | | |
|---|---|---|---|
| 1,910,141 | 5/1933 | Wemp | 192/48.3 |
| 1,957,500 | 5/1934 | Harris et al. | 192/48.3 |
| 2,077,487 | 4/1937 | Lyman | 192/48.92 X |
| 2,969,133 | 1/1961 | Langheck | 192/56 R |
| 3,429,407 | 2/1969 | Orwin et al. | 192/56 R |
| 4,075,873 | 2/1978 | Geisthoff | 192/56 R |
| 4,197,885 | 4/1980 | Mortenson | 192/42 |
| 4,373,923 | 2/1983 | Kilwin | 192/56 R X |
| 4,545,470 | 10/1985 | Grimm | 192/56 R |

FOREIGN PATENT DOCUMENTS 2654987 6/1977 Fed. Rep. of Germany .
805562 11/1936 France .
2085970 5/1982 United Kingdom .

Primary Examiner—Leslie A. Braun
Assistant Examiner—Nicholas Whitelaw
Attorney, Agent, or Firm—Wenderoth, Lind & Ponack

[57] ABSTRACT

A drive sleeve of the present invention includes a peripheral collar seated with an operational clearance, in a recess defined in a housing. The outside of the sleeve includes ribbing extending in the notches of a driving plate pressing a friction lining against the housing under the effect of a "Belleville" washer to which a load is appropriately applied by a flange.

8 Claims, 3 Drawing Sheets

STARTER DRIVE ASSEMBLIES FOR INTERNAL COMBUSTION ENGINES OF THE TYPE HAVING AN OVERRUNNING CLUTCH

BACKGROUND OF THE INVENTION

This invention pertains to improvements in starter drive assemblies for internal combustion engines having an overrunning clutch.

Drive assemblies of the type under consideration present a problem in that their overrunning clutches last only a relatively short time when the internal combustion engine malfunctions, for example, in the presence of frequent backfires, mechanical jamming, and the like, or in the event that successive impacts are sustained by the components upstream and downstream from the drive assembly.

These anomalies generate torque in excess of the maximum value produced by the starter motor, so that clamping of the rollers between the outer housing of the overrunning clutch and inner track thereof occurs due to overloading, causing said housing and track to deteriorate.

Before overrunning clutches were used in starter drive assemblies, the latter were equipped with automatic engaging and disengaging devices instead, but, of course, such assemblies were much less advantageous than assemblies using an overrunning clutch. A clutch system of this type was described in French Pat. No. 805.562 dated Apr. 30, 1936.

Since an overrunning clutch with rollers has come into common use to release the drive pinion of a starter for the large gear of a thermal engine when the latter is started, a way has never been found to avoid the problems mentioned above.

SUMMARY OF THE INVENTION

The object of this invention is to correct the problems considered in drive assemblies having overrunning clutches, and to provide a drive assembly especially suitable for customer needs.

In the drive assembly according to the invention, the cam housing of the overrunning clutch and the drive sleeve of the drive assembly are two separate elements operatively connected together using friction mechanisms that limit the torque transmitted between the inner track and the outer housing of the overrunning clutch.

The sleeve comprises a peripheral flange which is seated in a recess of the overrunning clutch housing with an operational clearance, while the outside of the sleeve comprises angular fastening means for supporting a drive washer urging a friction lining against the housing under the effect of elastic mechanisms.

BRIEF DESCRIPTION OF THE DRAWINGS

The attached drawings, given as an example, will provide a clearer understanding of the invention, its characteristics, and the advantages it can yield.

DETAILED DESCRIPTION OF THE PREFERRED EMBODIMENTS

Figure 1:
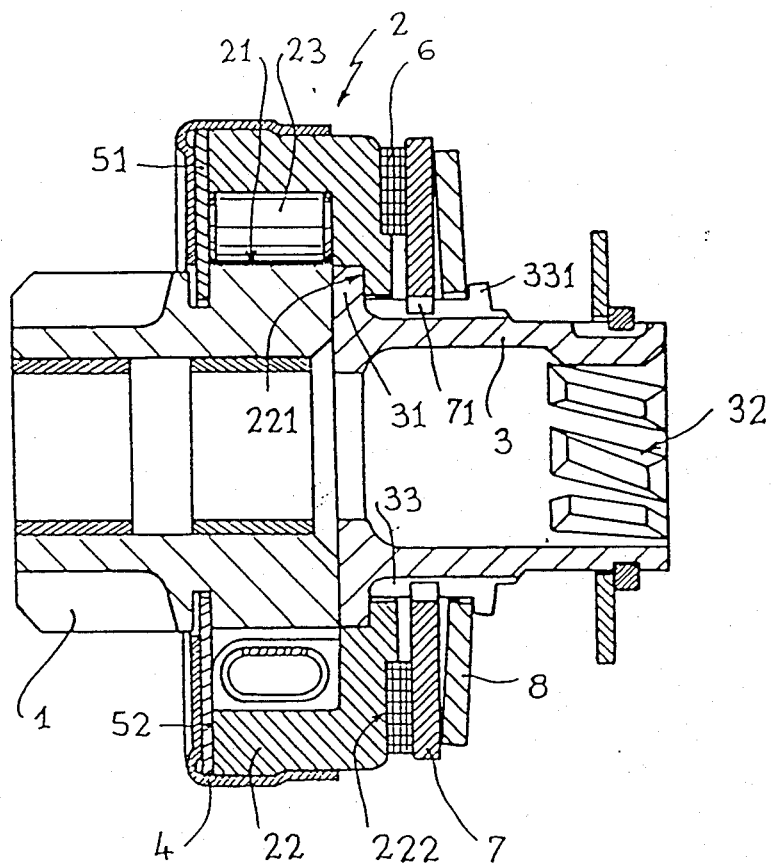
FIG. 1 is a longitudinal cross section of a drive assembly according to the invention.

The electric starter drive assembly for internal combustion engines shown in FIG. 1 comprises a drive pinion 1, the rear part of which constitutes a track 21 of an overrunning clutch 2, whose cam housing 22 is associated in a relatively rotatable manner with a drive sleeve 3. Of course, a series of loaded rollers 23 is located between track 21 and housing 22 in the usual manner; it is thus unnecessary to describe such an overrunning clutch in further detail herein.

The housing 22 has two portions having different outer diameters to hold an assembly hood 4 axially, as will be explained below. As is well-known, said hood 4 holds two half-washers 51, 52, ensuring the closed and the sealing of overrunning clutch 2. Housing 22 comprises an annular recess 221 in which a flange 31 of sleeve 3 is seated. Thus, hood 4 holds sleeve 3, housing 22 and pinion 1 together, yet flange 31 can turn freely with respect to the housing and pinion.

The drive assembly is mounted so as to slide in a shaft (not shown) comprising helical grooves designed to engage with teeth 32 having the same shape defined by the bore of sleeve 3 in the known manner.

The rear surface of housing 22, i.e., the surface facing sleeve 3, comprises a span 222 in which a friction ring or lining 6 made of any appropriate material is glued or fastened using any other method.

The periphery of sleeve 3 comprises, over part of its length, straight male ribbing 33 which engages teeth 71 having the same shape provided in the bore of a drive washer 7 pressing against lining 6.

A Belleville washer 8 is also disposed around ribbing 33. The free end of said ribbing forms a collar 331, intended to hold Belleville washer 8 under reaction pressure exerted by drive washer 7. Thus, by selecting the spring constant of Belleville washer 8, the support pressure, and consequently the drive torque of housing 22 and sleeve 3, can be predetermined.

Figure 2:
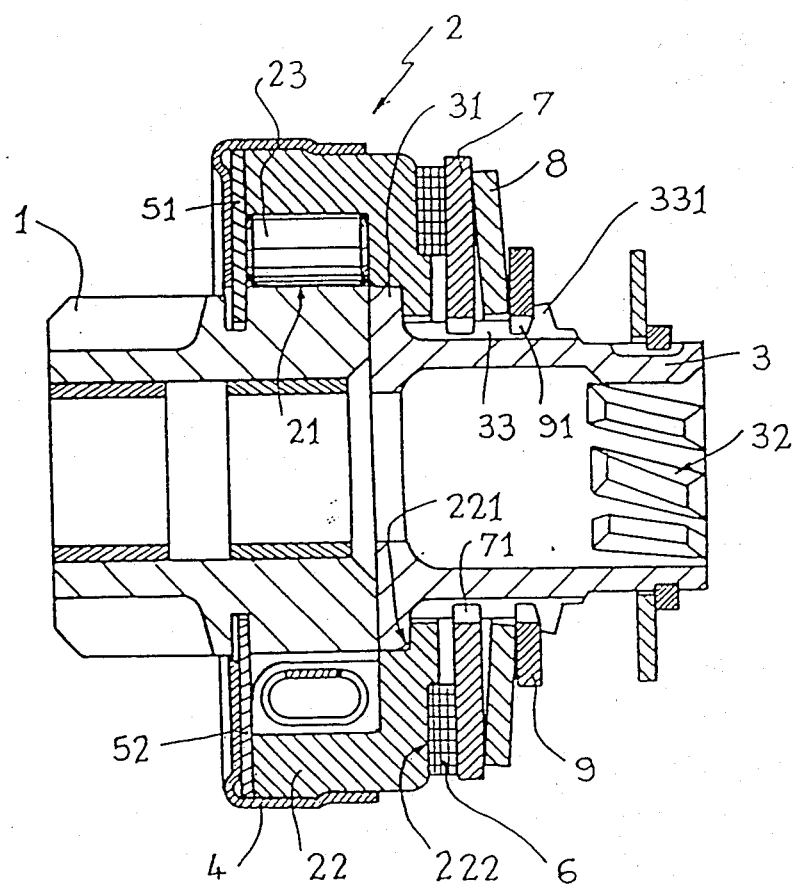
FIG. 2 is a similar view to that in FIG. 1, showing another embodiment of the present invention.

The embodiment illustrated in FIG. 2 employs a flat annular ring 9, whose bore is defined by notches 91 cooperating with ribbing 33 on the periphery of sleeve 3, to load Belleville washer 8. Around its bore, the outer surface of ring 9 is chamfered so that crimping 331 fits flush against said ring.

In a normal operating mode, housing 22 and the sleeve 3 are fastened together by the pressure exerted by driving plate 7 against lining 6, so that both components act as an integral unit. Conversely, if stress greater than normal occurs, for example, if the moment applied to pinion 1 is greater than the driving torque applied to sleeve 3, the elastic friction system acts as a torque limiter. Thus, the overheating of the electric starter drive motor, or the deterioration of the track and/or the cam housing of overrunning clutch 2 is prevented.

Figure 3:
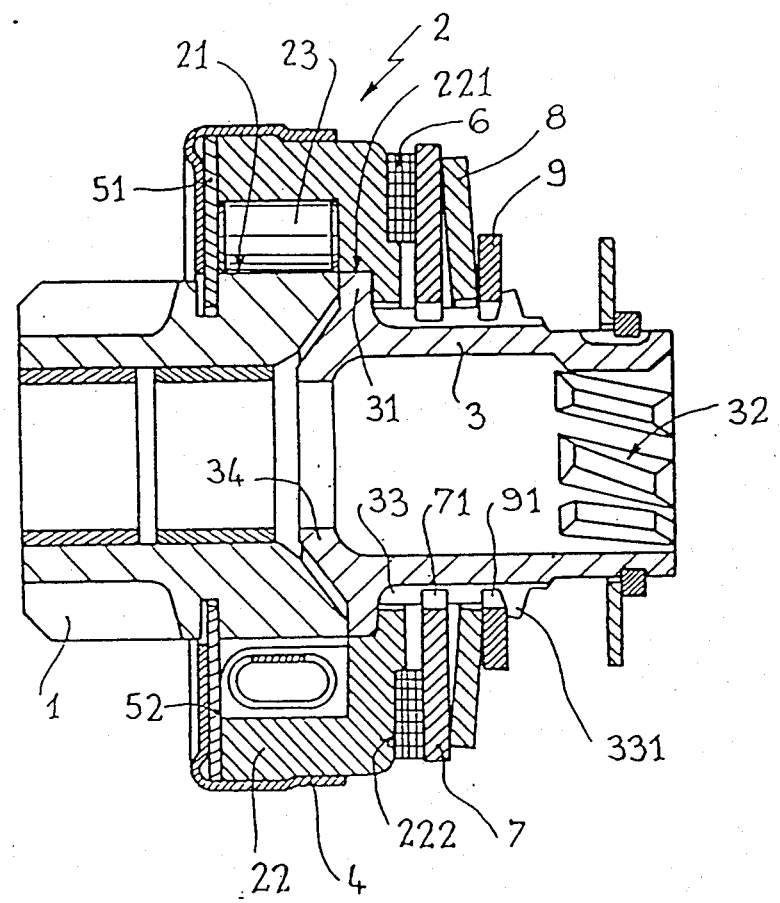
FIG. 3 illustrates the span of the drive sleeve of the drive assembly according to the invention extending within the inner track of its overrunning clutch. Although the modification illustrated in this figure is shown as applied to the embodiment in FIG. 2, it can equally apply to FIG. 1.

As illustrated in FIG. 3, sleeve 3 can comprise an axial extension 34 which is disposed within inner track 21 so as to bring the free end of the sleeve closer to the overrunning clutch, thus decreasing the total length of the drive assembly, and consequently of the starter. Of course, said penetration of the sleeve through the action of track 21 decreases the latter's resistance; however, said decrease presents no problems due to the presence of the torque limiter according to the invention.

The drive assembly thus constituted is a more appropriate design of the elements of the kinematic power transmission, which is comparatively light and less cumbersome.

Friction ring or lining 6 may be connected to housing 22 in any other suitable manner, for example, using grooves extending in span 222. It could also cooperate with hood 4 through the use of outside facets, fixing it angularly as the result of its cooperation with the hood at its radial necking. Lining 6 may also be fastened to plate 7 in an appropriate manner, with friction occurring along the span 222 of housing 22.

I claim:

1. A starter drive assembly of an internal combustion engine, said assembly comprising:

an overrunning clutch, a drive pinion defining an inner track of the overrunning clutch, a cam housing axially retained in the clutch relative to said drive pinion and defining an outer track of the overrunning clutch extending around said inner track and a flange-receiving recess, roller means on the overrunning clutch disposed in the assembly between said inner and said outer tracks, a drive sleeve having a flange seated in the flange-receiving recess defined by said housing and an angular fastening portion located on the outer peripheral surface of the sleeve, and torque limiting means operatively connected between said cam housing and said drive sleeve for allowing torque to be transmitted from said drive pinion to said drive sleeve through the overrunning clutch when torque applied to said drive pinion is below a predetermined value and for preventing torque from being transmitted from said drive pinion to said drive sleeve through the overrunning clutch when torque applied to said drive pinion exceeds said predetermined value, said torque limiting means including a friction lining disposed against said cam housing, a driving plate disposed against said friction lining and an elastic mechanism exerting a force on said driving plate that urges said driving plate against said friction lining, said driving plate engaging said driving sleeve at the angular fastening portion thereof, the angular fastening portion preventing said driving plate from rotating relative to said drive sleeve.

2. A starter drive assembly as claimed in claim 1, wherein the angular fastening portion of said drive sleeve is ribbing extending along the peripheral outer surface of the sleeve, said driving plate includes teeth engaging said ribbing, said drive sleeve also includes a collar, and said elastic mechanism is a Belleville washer disposed around said drive sleeve, said washer axially located and retained on said sleeve between said collar and said driving plate.

3. A starter drive assembly as claimed in claim 2, wherein said torque limiting means further includes a ring defining notches surrounding a bore extending therethrough, said ring disposed around said drive sleeve with the ribbing of said sleeve extending in said notches, and said ring axially located and retained on said sleeve between said collar and said Belleville washer.

4. A starter drive assembly as claimed in claim 1, wherein said drive sleeve includes an axial extension portion extending into said drive pinion and located radially within said inner track.

5. A starter drive assembly as claimed in claim 2, wherein said drive sleeve includes an axial extension portion extending into said drive pinion and located radially within said inner track.

6. A starter drive assembly as claimed in claim 3, wherein said drive sleeve includes an axial extension portion extending into said drive pinion and located radially within said inner track.

7. A starter drive assembly of an internal combustion engine, said assembly comprising:

an overrunning clutch, a drive pinion defining an inner track of the overrunning clutch, a cam housing axially retained in the clutch relative to said drive pinion and defining an outer track of the overrunning clutch extending around said inner track, a roller means of the overrunning clutch disposed in the assembly between said inner and said outer tracks, a drive sleeve axially retained in the clutch relative to said cam housing and having an angular fastening portion located on the outer peripheral surface of the sleeve, and torque limiting means operatively connected between said cam housing and said drive sleeve for allowing torque to be transmitted from said drive pinion to said drive sleeve through the overrunning clutch when torque applied to said drive pinion is below a predetermined value and for preventing torque from being transmitted from said drive pinion to said drive sleeve through the overrunning clutch when torque applied to said drive pinion exceeds said predetermined value.

8. A starter drive assembly as claimed in claim 7, wherein said cam housing further defines a flange-receiving recess, and said drive sleeve has a flange seated in the flange-receiving recess defined by said housing.

* * * * *